United States Patent [19]

Wolinski

[11] Patent Number: 4,587,019
[45] Date of Patent: May 6, 1986

[54] AEROBIC DIGESTION OF SLUDGE

[75] Inventor: Waldemar K. Wolinski, Hitchen, England

[73] Assignee: Water Research Centre, Marlow, England

[21] Appl. No.: 690,538

[22] Filed: Jan. 11, 1985

[30] Foreign Application Priority Data

Jan. 17, 1984 [GB] United Kingdom ............... 8401130

[51] Int. Cl.$^4$ .......................................... C02F 11/02
[52] U.S. Cl. ................................... 210/608; 210/613; 210/620
[58] Field of Search ............... 210/608, 613, 620, 629, 210/703, 221.1, 221.2

[56] References Cited

U.S. PATENT DOCUMENTS

| 2,772,234 | 11/1956 | Kelly | 210/2 |
| 3,397,140 | 8/1968 | Dea | 210/608 |
| 3,745,113 | 7/1973 | Fuchs | 210/608 |
| 3,787,316 | 1/1974 | Brink et al. | 210/608 |
| 4,069,149 | 1/1978 | Jackson | 210/608 |
| 4,493,770 | 1/1985 | Moilliet | 210/603 |

FOREIGN PATENT DOCUMENTS 1524765  9/1978  United Kingdom .

OTHER PUBLICATIONS

Korrespondenz Abwasser, Nov. 1984, pp. 934–939.

Primary Examiner—Thomas Wyse
Attorney, Agent, or Firm—Watson, Cole, Grindle & Watson

[57] ABSTRACT

In the aerobic digestion of sludges, particularly but not exclusively primary sedimentation sewage sludges, a layer of sludge foam is deliberately maintained over the sludge surface to improve the efficiency of the process. The layer of foam may have a volume of at least 50% of that of the sludge. The digestion process is effected in a digester, in which the amount of foam may be reduced (as necessary) by injecting sludge directly into the foam to cause local collapse thereof. A digester vessel especially suited for use in the process is described.

8 Claims, 3 Drawing Figures

AEROBIC DIGESTION OF SLUDGE

This invention relates to a method and apparatus for the aerobic digestion of aqueous materials containing biodegradable materials.

It is known to stabilise a sludge, such as a primary sedimentation sewage sludge, by subjecting it to aerobic digestion. In such a process, a quantity of the sludge containing suitable aerobic bacteria is supplied with gaseous oxygen. It is important to maintain an adequate supply of oxygen in the sludge during digestion, and whilst pure or purified oxygen gas can be used, it is usually far more economic to use air. A disadvantage of this is, however, that the provision of 1 volume of oxygen in the sludge requires at least 5 volumes of air to be passed into the sludge (since oxygen constitutes only 1/5 by volume of air). The passage of air through the sludge (and, at best, 4/5ths of the air will not be absorbed by the sludge) gives rise to the formation of a foam on and above the sludge surface.

Foam formation has hitherto been regarded as a nuisance and various procedures have been adopted for overcoming the problem. For example, foam cutters have been mounted above the sludge to break down the foam as it forms, or the foam has been drawn off, broken down and then the resulting solids returned to the digester. Also, oils and the like have been added to the sludge to reduce the tendency for foam formation.

It has now been found that, contrary to previous teachings, the presence of a layer of foam on the sludge is, in fact, advantageous and that substantial benefits can be obtained by its maintenance and retention rather than by its removal. In particular, it has been found that the maintenance of an adequate layer of foam on the sludge leads to a substantial increase in the proportion of oxygen (in the air) which is utilised. Indeed, whilst past workers (who dispensed with the foam) achieved utilisation of only about 10 to 30% of the oxygen in the air, it has been found that proportions in excess of 50% and up to and including 100%, can be utilised. Whilst not to be bound by theory, it is believed that the presence of a suitable foam layer markedly slows down the passage of air bubbles and that, as a result, the oxygen in the air is largely absorbed during its passage through the foam.

In one aspect of the present invention, there is provided a process for the aerobic digestion of a sludge utilising air, wherein a sludge foam layer is formed over the surface of the sludge whereby at least 50% of the oxygen in the air is absorbed.

In general, the foam layer should be as large as possible consistent with the efficient utilisation and operation of the digestion process as a whole. That is to say, the proportion of oxygen utilised will generally increase with increasing amounts of foam, but this has to be balanced against the necessity either to provide large digestion vessels (to accommodate the sludge and the foam layer) or to treat smaller batch volumes of sludge in a conventional digester (to allow increased space for the foam). A compromise may have to be struck, but it will be understood that more efficient utilisation of oxygen brings with it a number of advantages including reduced costs and reduced residence times for the sludge in the digester.

By way of example, it has been found that good results are obtained if the volume of foam is at least 50% of, and preferably at least equal to, the volume of sludge. In one specific example, a 6 m$^3$ digester is utilized containing about 2 m$^3$ sludge and 3 to 3½ m$^3$ foam. These figures are given by way of example: the best arrangements in any particular case will depend upon a number of factors.

In another aspect, the invention provides a process for the aerobic digestion of sludge, wherein oxygen or an oxygen-containing gas is supplied to the sludge, and wherein a sludge foam is maintained over the surface of the sludge, the volume of foam being at least 50% of that of the sludge.

The foam which forms during the aerobic digestion is a coherent, essentially non-flowing foam comprising liquid and suspended solids. Whilst, in accordance with the present invention, the presence of an adequate foam layer is necessary, it is nevertheless also necessary in practice to take steps to prevent the amount of foam becoming too great and thus overflowing from, or otherwise blocking, the vessel. Some of the prior art techniques for controlling the volume of foam can be used but these are not preferred. Thus, the known use of a propellor-type foam cutter mounted above the foam adds to the cost and is not very satisfactory. Allowing the foam to "overflow" (i.e. be driven out of the digester, by the air pressure, over a weir or the like) is also unsatisfactory in that the overflow foam then has to be broken down and returned to the digester, which again involves extra process steps and, hence, extra expense.

In the present invention, it is preferred to keep the foam within the digester and to control the amount of foam by passing sludge into the upper part of the digester so that it passes into the foam, thus causing local collapse of the foam. In this way, it has been found that the amount of foam can be adequately controlled and the overall efficiency of the process improved. Since most aerobic sludge digestion processes are operated on a semi-continuous basis, the sludge which is pumped into the upper regions of the digester (to control the foam) is recirculated sludge, i.e. sludge which has been temporarily withdrawn from the digester to be subsequently returned. Raw sludge may also be fed into the foam layer in addition to, or instead of, recirculated sludge to control the foam height.

We prefer to provide several return inlets for the sludge in the upper regions of the digester so as to achieve adequate control of the foam layer. The returning sludge may be pumped into or onto the foam if desired, or near the foam/sludge interface, although the precise arrangement used will depend on the overall operating conditions. Variability in foam height requires sludge to be directed into the upper regions of the digester only when excessive foaming occurs. To facilitate this automatically, a foam level sensing device would be used which would control actuated valves (possibly pneumatic or solenoid types) and automatically route sludge through the appropriate valves i.e. top valves to reduce foam levels and bottom valves with little or tolerably high foam levels.

We have further found that the maintenance and control of an adequate foam layer in accordance with the invention is facilitated by using a digester vessel of different shape from those conventionally used. In particular, we have found that it is advantageous to provide a vessel in which, at least in the upper region where the foam is maintained, the horizontal cross-sectional area increases with increasing height. Thus, as the foam level rises, the volume of the vessel in which it is accommodated increases. In one example, the wall(s) of the digester vessel are divergent in an upward direction.

Thus, the digester may be essentially of triangular shape in at least one vertical section, or it could be of inverted cone-shape, for example. The invention includes per se a digester vessel of the shape described, and such a vessel including one or more sludge inlet ports in the foam region thereof.

The method of the invention is particularly useful in the aerobic digestion of raw sewage sludge from the primary sedimentation stage. It is not applicable to waterworks sludges.

The aerobic digestion process may be conducted with thermophilic micro-organisms, so that the temperature of the sludge rises to about 50° or 60° C., thus pasteurising the sludge. Thermophilic aerobic digestion is a known process.

In the process of the present invention, oxygencontaining gas (usually air) is supplied to the sludge. There are many known ways of effecting this. In accordance with a preferred feature of the present invention, air is injected under pressure into the sludge before it enters the digester. Alternatively, or in addition, gas diffusers or the like can be provided in the digester vessel itself.

Whilst the invention has been particularly described with reference to the treatment of sludge, it can in principle also be applied in the biological and/or biochemical treatment of other materials such as, for example, sewage. Such users are also included within the scope of the present invention.

In order that the invention may be more fully understood, embodiments thereof are shown, by way of example only, in the accompanying drawings, in which.

Figure 1:
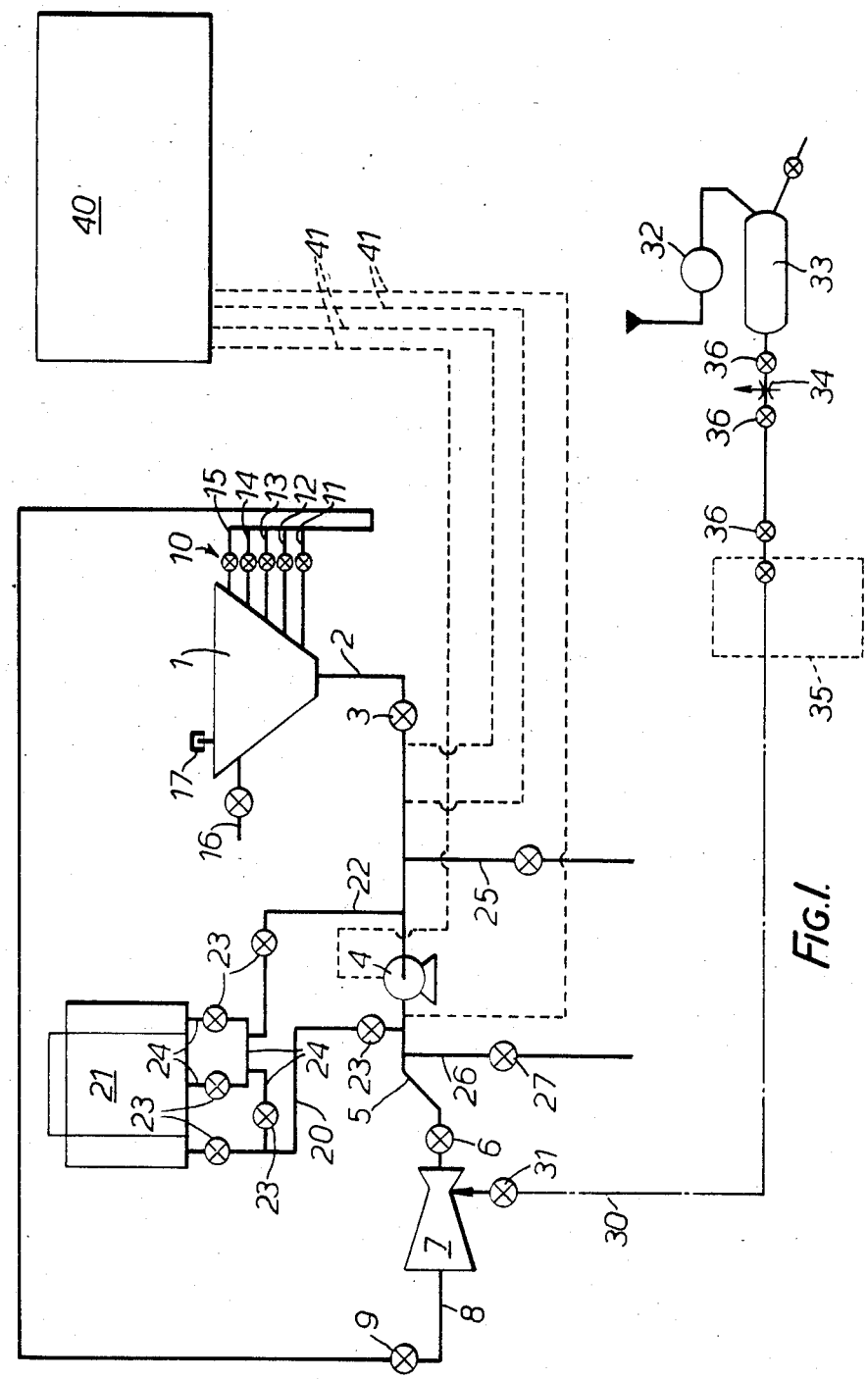
FIG. 1 is a schematic illustration of a plant for carrying out the method of the invention.

Referring to FIG. 1, the digester vessel 1 is connected to a sludge outlet pipe 2 which connects, via a valve 3, to a pump 4. The pump 4 is connected by pipe 5 and via valve 6 to a venturi device 7. From the outlet side of device 7 is pipe 8 which connects, via valve 9, to manifold 10 comprising a series of valved inlet pipes (11-15) to reactor 1. The pipes 11-15 each enter reactor 1 at a different level as illustrated. Reactor 1 has a valved overflow 16 near its top, and a gas exit port 17 upstanding from its top.

Downstream of pump 4 is a pipe loop to a heat exchanger 21, the loop comprising a pipe 20 for delivering sludge to the heat exchanger 21, and a return pipe 22 to pipe 2 upstream of pump 4. Various valves 23 and interconnecting pipes 24 are provided in the loop.

A valved raw sludge feed pipe 25 connects into pipe 2 intermediate valve 3 and pipe 22, and a stabilised sludge outlet pipe 26 with valve 27 connects to pipe 5 downstream of pump 4 and pipe 20.

A compressed air supply unit provides compressed air via line 30 (and valve 31) to the venturi 7. The unit comprises a compressor 32, a reservoir 33, a regulator 34 and an air control box 35, with associated valves 36.

Various components of the system are connected electrically to a control unit 40, some (but not all) of the control lines being indicated (41) by way of example. These control lines may be connected to pressure sensors or the like to monitor the process, and to working components such as pump 4 to control the process. Unit 40 normally includes a recorder to record the various process parameters.

In operation of the plant of FIG. 1, pump 4 withdraws treated sludge from digester 1 via pipe 2. In the case of a thermophilic micro-organism digestion, the sludge may be hot (depending on how long it has been in the system) and, if so, it can be circulated around the heat exchange loop (via pipes 20,22, and heat exchanger 21) to heat raw sludge yet to be treated. Fully treated sludge is run off via line 26.

In venturi 7, the sludge is aerated, the air being supplied via line 30. Thereafter, the aerated sludge passes via pipe 8 to manifold 10 and thence into vessel 1 via one or more of the pipes 11 to 15. This supply of sludge (be it recycled, raw, or a mixture of recycled and raw) is used to reduce the amount of foam in the top of vessel 1, if necessary, by passing it through pipe 14 or 13 into, or on to, the foam. This is described more fully with reference to FIG. 2 hereafter.

Raw sewage is introduced into the system via pipe 25, as and when required. Control unit 40 receives information as to the process parameters and can control various operating units such as the pump and the air supply accordingly, The sludge supply into vessel 1 is controlled via the various inlet pipes 11 to 15 to achieve and maintain the desired foam layer over the sludge in the vessel.

Figure 2:
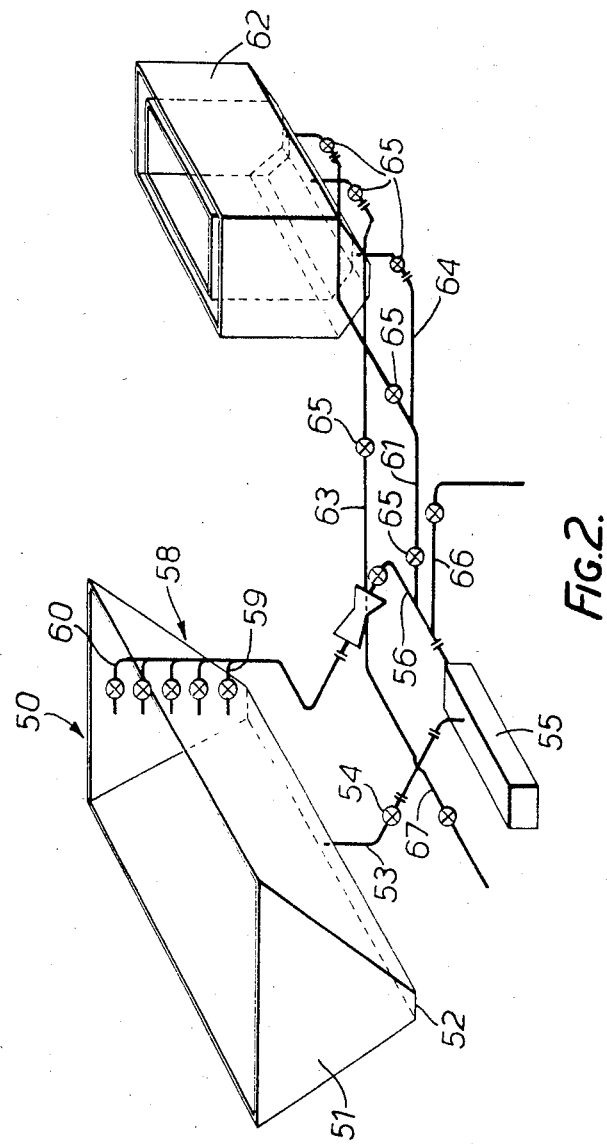
FIG. 2 is a schematic illustration of part of another plane for carrying out the invention.

FIG. 2 illustrates schematically only a part of a whole plant for carrying out the process of the invention. Referring to the Figure, there is shown a digester vessel 50 which, in end elevation is essentially triangular (or trapezoidal) - see end wall 51. Thus, the horizontal cross-sectional area of the vessel increases with increasing height from the bottom 52 of the vessel.

A sludge outlet pipe 53 leads (via valve 54) from the bottom 52 of vessel 50 to pump 55, and from the high pressure side of pump 55 a return pipe 56 leads to the venturi 57 and from there to the manifold 58 comprising the five individual valved return pipes illustrated, the lowest and highest being labelled 59,60 respectively.

A heat exchanger loop is provided comprising pipe 61 (branching from pipe 56 downstream of pump 55) leading to heat exchanger 62, and return pipe 63 from heat exchanger 62 to pipe 53 (upsteam of pump 55). The loop includes other pipework 64 and valves 65.

Downstream of pump 55 is valved pipe 66 for draining off fully treated sludge. Upstream of pump 55 is a valved raw sludge feed pipe 67.

The operation of the illustrated equipment of FIG. 2 is essentially the same as in FIG. 1. Pump 55 draws sludge from digester 50 via pipe 53 and delivers it through venturi 57 (where it is aerated) to manifold 58 and return into digester 50. A layer of sludge foam is maintained over the sludge in digester 50. There is a tendency for the amount of such foam continuously to increase, and the amount is kept to a predetermined maximum by injecting the returned sludge through appropriate inlet pipes (60) into or on to the foam. The lower inlet pipes (e.g. 59) will normally be below the sludge surface and can be used when it is desired to return some part of the sludge without affecting the foam.

As appropriate, treated sludge can be withdrawn from time to time via pipe 66, and fresh (raw) sludge admitted via pipe 67. In the case of using thermophilic micro-organisms, the hot sludge from the digester can be circulated around the heat exchanger loop to recover the heat and utilise it elsewhere in the process, e.g. for heating incoming raw sludge.

Figure 3:
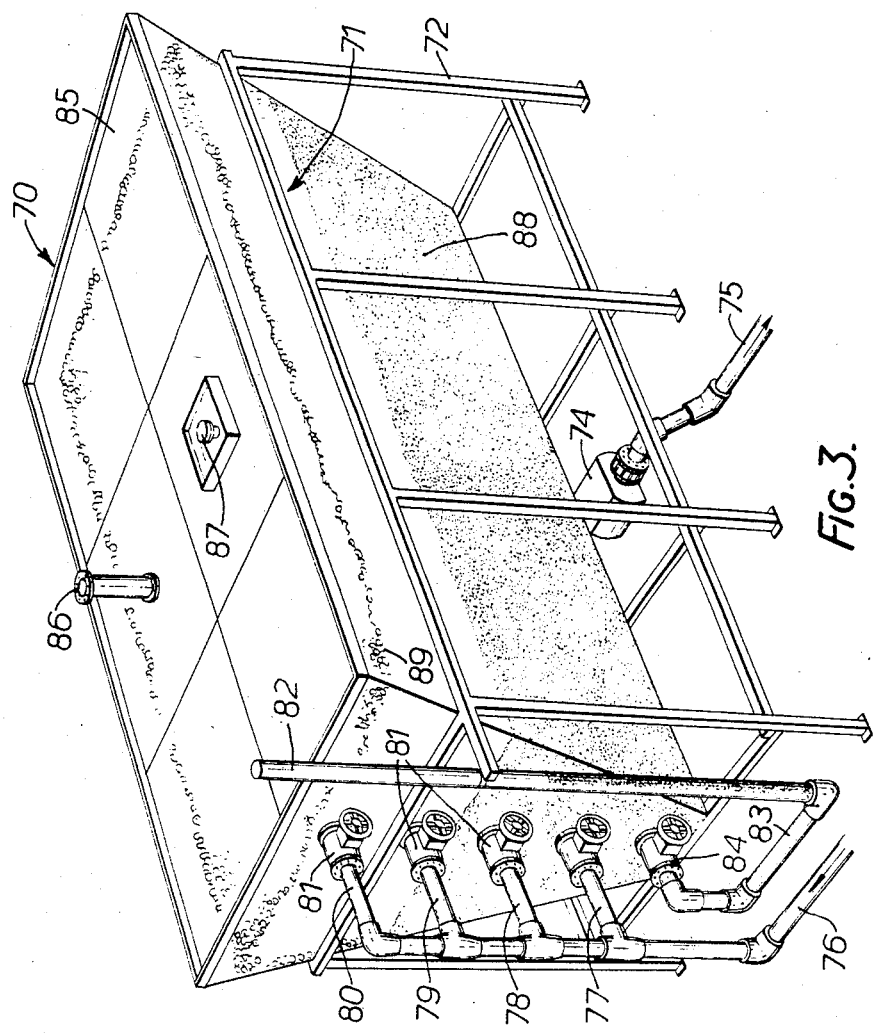
FIG. 3 is a view of a digester vessel in use.

FIG. 3 is a view of one embodiment of a digester vessel of the invention in use, with the contents also being shown (in practice the vessel walls and top would normally not be transparent). As can be seen, the digester vessel 70 is of a hopper-like shape, i.e. it is rectangular in plan and triangular (or trapezoidal) in end elevation, the side walls 71 diverging upwardly so that the horizontal cross-sectional area of the vessel increases with increasing height. As illustrated, the vessel is supported by a framework 72, but this forms no part of the present invention.

Mounted below vessel 70 is a pump 74 to withdraw sludge from the bottom of the vessel and deliver it through pipe 75. After aeration and other treatments as previously described, sludge returns (or is delivered) to vessel 70 along pipe 76. As illustrated, pipe 76 has four delivery sections 77,78,79 and 80, each including a valve 81. The sections 77 to 80 each enter vessel 70 at a different height. The vessel is also provided with a vertical sight glass 82 (supplied by pipe 83 via valve 84) to indicate the depth of vessel contents. In the top 85 of the vessel is a gas outlet pipe 86, and a pressure relief valve 87.

The vessel contains a mass of sludge 88 and a layer of foam 89 thereover. The formation of a foam is inevitable and, in the prior art, effort has been made to keep it to a minimum. It has been found, however, that the presence of a foam layer is, in fact, highly advantageous. All the foam is retained within the vessel 70 but the amount of foam may have to be controlled to prevent it becoming excessive. FIG. 3 shows that delivery sections 79 and 80 will deliver sludge into the foam. Such a delivery tends to break down the foam and is thus used, in accordance with a preferred feature of the present invention, to keep the amount of foam from becoming excessive. The remainder (if any) of the sludge can be supplied through the other sections 77,78 which will cause some desirable agitation of the sludge in the vessel. The sections 79,80 may be fitted with nozzles in order to deliver the sludge as a spray into, or on to, the foam.

I claim:

1. In a process for the aerobic digestion of a biodegradable sludge, wherein the sludge is aerated with air in a digester vessel and sludge foam is formed and builds up over the surface of the sludge, the improvement which comprises continuously maintaining a layer of said foam over the surface of the sludge in an amount at least sufficient to ensure that at least 50% of the oxygen in the air is absorbed during the digestion, and wherein none of the foam formed is removed from the vessel but the build-up is controlled by passing sludge directly into or on to the foam in the vessel to cause the local collapse of any excess foam.

2. A process according to claim 1, wherein the volume of foam in said layer is at least 50% of the volume of sludge.

3. A process according to claim 1, wherein the sludge which is passed into the foam is recirculated sludge or raw sludge or a mixture thereof.

4. A process for the aerobic digestion of a biodegradable sludge wherein the sludge is reacted in a vessel with micro-organisms in the presence of air or another oxygen-containing gas, and wherein during said digestion gas bubbles rise in the sludge and build up a sludge foam layer in a region over the sludge, the improvement wherein the build-up of foam in said region is positively controlled, without removing foam from the vessel, by passing sludge into or on to the foam to cause local collapse thereof, to maintain all the foam within the vessel and at a foam and volume of at least 50% of that of the sludge, the vessel being so shaped at least in said region, that its horizontal cross-sectional area increases with increasing height.

5. A process according to claim 4, wherein the digester vessel includes opposed wall portions which are divergent in an upward direction.

6. A process according to claim 4, wherein the oxygen, air or other oxygen-containing gas is injected under pressure into the sludge outside the digester vessel.

7. A process according to claim 1, wherein the sludge for digestion is raw sewage sludge from a primary sedimentation stage of a sewage treatment process.

8. A process according to claim 1, wherein the digestion is effected using thermophilic micro-organisms.

* * * * *